United States Patent [19]

Hotovy

[11] Patent Number: 4,896,136

[45] Date of Patent: Jan. 23, 1990

[54] COMBINATION BRAKE LIGHT AND INTERIOR LIGHT FOR MOUNTING ON THE DOOR OF A TRUCK CAP

[75] Inventor: Robert Hotovy, New Buffalo, Mich.

[73] Assignee: Creation Windows, Inc., Elkhart, Ind.

[21] Appl. No.: 132,470

[22] Filed: Dec. 14, 1987

[51] Int. Cl.⁴ .................... B60Q 1/26; B60Q 1/44
[52] U.S. Cl. .................................. 340/468; 340/479; 362/80; 362/80.1
[58] Field of Search ............ 340/89, 87, 84, 97, 340/66, 69, 74, 99, 468, 469, 472, 479, 473; 362/129, 80, 242, 61, 63, 71, 227, 234, 251, 80.1

[56] References Cited

U.S. PATENT DOCUMENTS

| | | | |
|---|---|---|---|
| 2,694,138 | 11/1954 | Schwinn | 340/134 |
| 4,353,111 | 10/1982 | Gallitzendörfer et al. | 362/80 |
| 4,628,417 | 12/1986 | Kaminski et al. | 362/80 |
| 4,656,563 | 4/1987 | Segoshi et al. | 362/80 |
| 4,731,708 | 3/1988 | Gonas | 340/97 |
| 4,777,569 | 10/1988 | Wen | 362/80 |

Primary Examiner—Donnie L. Crosland
Attorney, Agent, or Firm—Haight & Hofeldt

[57] ABSTRACT

A combination brake light and interior light for mounting on the rear door of a truck cap. The combination light includes a housing mounted on the rear door of the truck cap. The housing holds a brake light indicator lens on one side, facing the rear door. When the rear door is closed, the brake light indicator lens is substantially vertically disposed. Proximate to the brake light indicator lens, a brake light bulb is disposed within the housing. Apparatus for energizing the brake light bulb upon operation of the truck brakes are included. Additionally, an interior light lens is held on another side of the housing. Proximate to the interior light lens, an interior light bulb is held within the housing. Apparatus for selectively energizing the interior light bulb are also included.

12 Claims, 2 Drawing Sheets

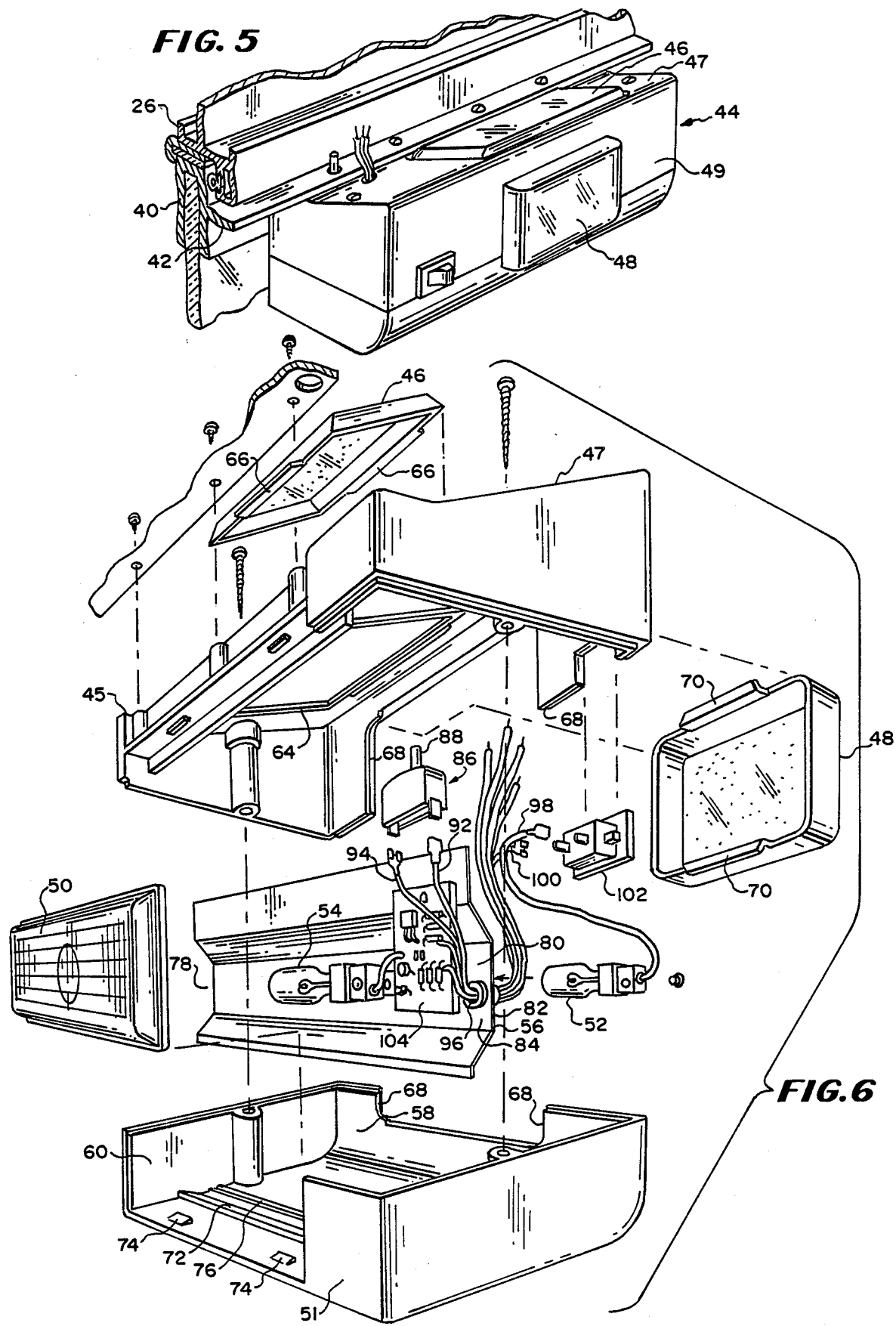

COMBINATION BRAKE LIGHT AND INTERIOR LIGHT FOR MOUNTING ON THE DOOR OF A TRUCK CAP

FIELD OF THE INVENTION

The owners of many pick-up trucks enclose the truck bed with a cover which is commonly called a truck cap. Such truck caps are commonly provided with windows on all four sides, that is, the two sides of the vehicle, the front adjacent to the cab of the truck and at the rear, usually directly over the tailgate of the truck. The front and side windows may be permanently fixed, or may be made to open by sliding into an overlapping relationship; or they may be pivotally mounted, such that they would swing outward and upward at the bottom. The rear window of the cap is frequently formed as a door, which is hinged at the top such that the bottom may be swung rearward and upward away from the tailgate, which may swing rearward and downward.

Federal motor vehicle standards now require that currently manufactured automobiles be provided with a supplemental brake light mounted within the area of the rear window. It is believed that this supplemental brake light mounted considerably higher than the usual brake lights, which are usually located at or slightly above the rear bumper level, are more effective in attracting the attention of a driver following the vehicle in which the brakes are applied. While such a supplemental brake light could be mounted within the parameter of the rear window of a cab of a pick-up truck, it may in some cases be much less visible to the operator of a following vehicle, particularly if the top edge of the tailgate of truck is relatively high compared to the height above the pavement of the driver of the following vehicle. Further, such a supplemental brake light could be obscured from the view of a driver of a following vehicle if a cap were placed over the bed of the pick-up truck with curtains or smoked windows that hide the brake light. Even though such a supplemental brake light in the rear window of a truck cap, may not be required by Federal Regulations for obvious safety reasons, the owners or drivers of pick-up trucks with caps may find such a supplemental brake light desirable for safety reasons. Further, the users of caps on pick-up trucks find it desirable to have an interior light which illuminated the bed of the truck when the rear cap door is opened.

BACKGROUND INFORMATION

While combination brake lights and interior lights for mounting in the rear door of a pick-up truck cap have not previously been provided, combination lighting devices have been disclosed for use on the trunk lids of passenger cars. For instance, U.S. Pat. No. 2,221,178, issued Nov. 12, 1940, to Frank C. Best, shows a signal device which provides a brake light which is located near the center of the trunk lid in combination with a tail light and a means for illuminating the license plate. Further, the same lamp which illuminates the license plate and the tail light illuminates the interior of the trunk, at anytime that the tail lights are energized. No arrangement is provided for discontinuing the illumination of the trunk when the trunk lid is closed. Further, the signal device is neither adapted nor does it suggest a mechanism for adapting it for mounting on a truck cap door. Other combination vehicle lights, similar to that shown in the Best patent, are shown in U.S. Pat. No. 2,054,919, issued Sept. 22, 1936, to Benjamin H. Anibal, and in U.S. Pat. No. 2,736,005, issued Feb. 21, 1956, to Charles L. Craddock.

It is an object of the present invention to provide a combination supplemental brake light and interior light for mounting on the rear door of a truck cap, which brake light is readily visible to vehicles following the pick-up truck, and which interior light is automatically energized, unless disabled, upon opening of the cap rear door.

SUMMARY OF THE INVENTION

The present invention provides a combination lighting device including a supplemental brake or stop light and an interior light which is readily mounted on the rear door of a pick-up truck cap. The combination lighting device is provided with means to mount it on the upper frame of the door, such that the supplemental stop light when energized will be visible through the door window near the top thereof. An electrical switch is provided in the combination device, such that upon opening of the truck cap door, a bulb is energized to provide interior lighting, unless a manual switch is actuated to disable the interior lighting. The light from the bulb is directed into the rear cargo or load carrying portion of the pick-up truck.

BRIEF DESCRIPTION OF THE DRAWINGS

FIG. 5 is an enlarged view of the combination additional brake light and interior light of this invention shown secured to the upper frame of the truck cap rear door;

FIG. 6 is an exploded perspective view of the combination additional brake light and interior light shown in FIG. 5.

DETAILED DESCRIPTION OF THE PREFERRED EMBODIMENT

Figure 1:
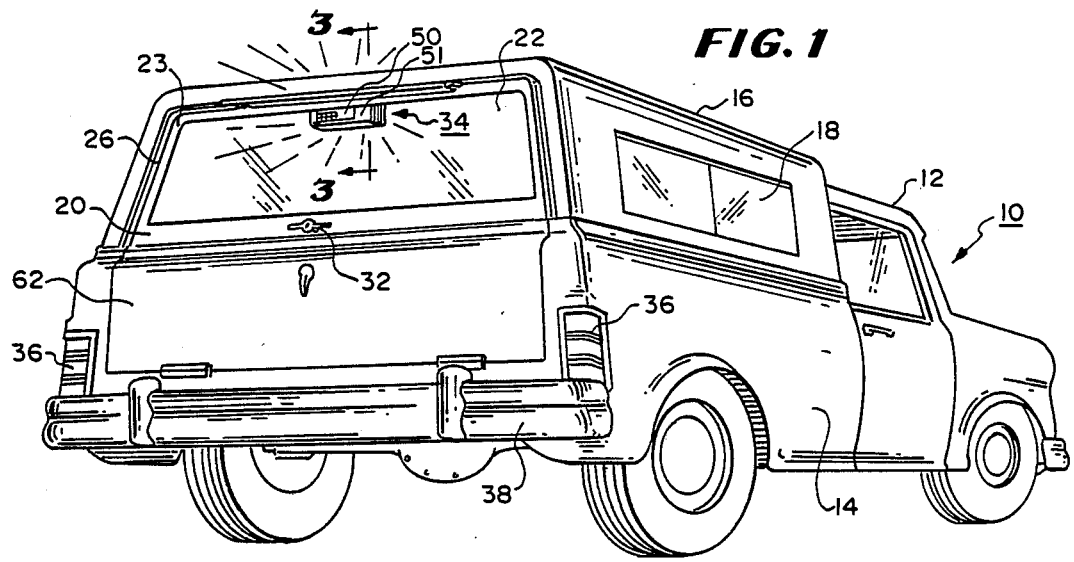
FIG. 1 is a perspective view of a pick-up truck provided with a cap having, a rear door on which has been installed the combination additional brake light and interior light of this invention.

Referring to FIG. 1, a pickup truck 10 having the usual cab portion 12 and load carrying portion 14 is provided with a cover 16 for the load carrying portion. The cover, commonly called a cap, is provided with side windows 18 and a rear door 20.

Figure 2:
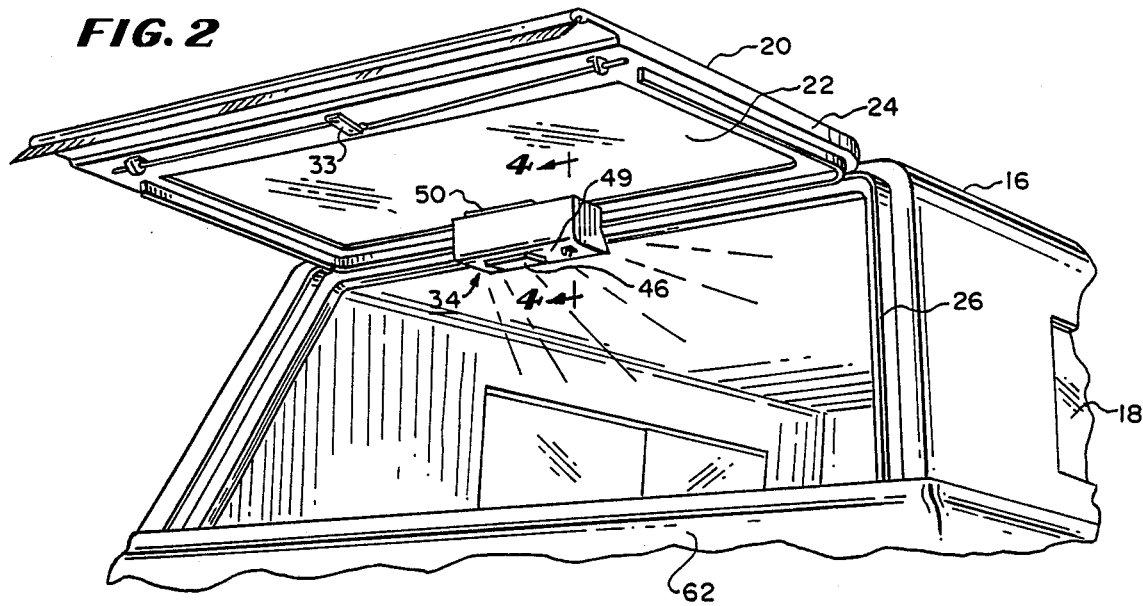
FIG. 2 is an enlarged perspective view of the pick-up truck of FIG. 1 with portions broken away showing the cap door in the open position.

Referring to FIGS. 1 and 2, the rear door 20 includes a window 22 formed of a translucent material, such as glass, surrounded by a window frame 23. A door frame 26 is formed in the rear wall of the cap 16, and is shaped to receive in close fitting relationship the channel member 24 forming the peripheral edge of the rear door.

Figure 3:
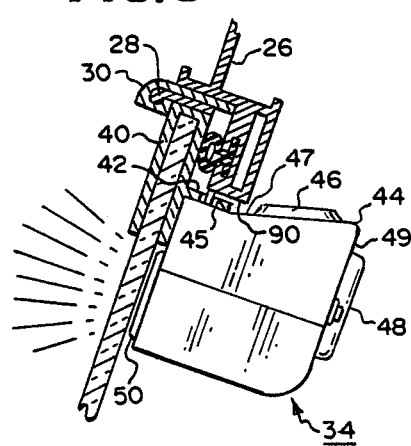
FIG. 3 is a cross-sectional view taken along the line 3—3 in FIG. 1.
Figure 4:
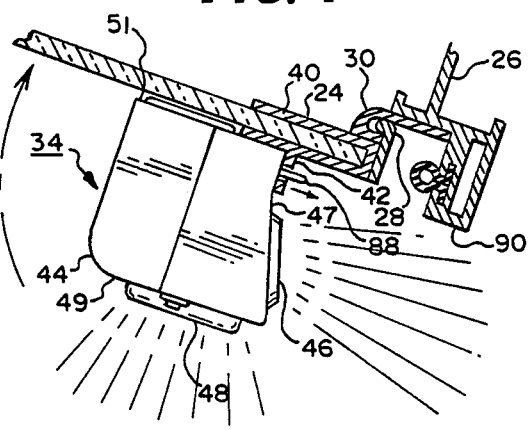
FIG. 4 is a cross-sectional view taken along the line 4—4 in FIG. 2.

Referring to FIGS. 3 and 4, a first hinge member 28 is provided on the top surface of the channel member 24, while a second hinge member 30 is secured to the inner edge of the upper edge of the door frame 26. The first and second hinge member 28 and 30 form a hinge connection between the door frame 26 and the rear door 20, to permit the rear door to be pivoted between the open position shown in FIG. 2 to the closed position shown in FIG. 1. The rear door 20 may be secured in the closed position by rotation of a handle 32, shown in FIG. 1. Rotation of the handle 32 causes the locking mechanism 33, shown in FIG. 2, to engage the sides of the frame 26 to secure the rear door 20 in the closed position.

In accordance with this invention, a combination additional brake light and interior light 34 is provided near the upper edge of the window 22. While the pickup truck 10 is provided with brake lights 36 in their usual position just above the bumper 38, it has been found desirable to provide an additional brake light at an elevated position in the center of the vehicle. As previously set forth, Federal Motor Vehicle Standards now require that currently manufactured passenger vehicles be provided with such a supplemental brake light.

In accordance with this invention, as best seen in FIG. 5, the combination additional brake light and interior light 34 is mounted on the channel member 24 of the rear door 20. As shown in FIG. 5, the channel member 24 includes a U-shaped channel 40, within which the window 22 is held, and a shoulder 42, extending orthogonally from the interior leg of the channel 40. As shown in FIGS. 5 and 6, the shoulder 42 has bores drilled through, to receive screws for mounting the combination light 34.

As shown in FIGS. 5 and 6, the illustrated combination light 34 comprises a two-piece housing 44 having opague outer walls held together by fastener means such as screws. The housing 44 has threaded apertures disposed along its mounting surface 45 adapted to receive the screws for mounting the combination light on the shoulder 42. The housing 44 holds a first interior light lens 46 on one side 47, a second interior light lens 48 on another side 49, and a brake light indicator lens 50 on another side 51. The interior light lenses 46 and 48 are illuminated by an interior light bulb 52, and the brake light indicator lens 50 is illuminated by a brake light indicator bulb 54. Bulbs 52 and 54 are mounted in the interior of the housing 44 on opposite sides of a dividing or separating means shown as a reflector chassis 56, which divides or separates the housing's interior into first and second portions shown as an interior light chamber 58 and a brake light chamber 60.

In the illustrated embodiment, the interior light lenses 46 and 48 are both made of a light transmissive means such as translucent plastic, and both protrude from the housing 44. The brake light indicator lens 50, which is also made of a light transmissive means, is constructed so as to comply with the applicable Federal Motor Vehicle Standards. In the illustrated embodiment, the brake light indicator lens is red in color, and is constructed in accordance with U.S. Pat. No. 4,575,782, the disclosure of which is incorporated herein by reference.

To maximize the visibility of the brake light indicator lens 50 to drivers of following vehicles, it is desirable that the brake light indictor lens be disposed so that its illumination is directed substantially rearwardly. For caps that are high from the ground, it may be desirable that the illumination be directed slightly downwardly. To maximize the illumination of the cap's interior when the rear door 20 is open, it is desirable that the first interior light lens 46 be disposed so that the illumination is directed forwardly. To accomplish these objectives, the housing 44 holds the brake light indicator lens 50 so that the lens is substantially vertical when the rear door 20 is closed. The housing 44 holds the first interior light lens 46 so that the lens is substantially vertical when the rear door 20 is open.

However, as is best seen in FIGS. 3 and 4, the rear door 20 of the cap 16 typically is not vertically-disposed when closed; rather, the rear door 20 typically slopes rearwardly from its top. When fully opened, the rear door typically is not horizontal, but slopes upwardly from its top. To maximize the visibility of the illumination under these conditions, the housing 44 holds the brake light indicator lens 50 and first interior light lens 46 obliquely to the rear door 20 and window 22. The brake light indicator lens 50 and first interior light lens 46 are also disposed obliquely to the mounting surface 45 of the combination light 34, as well as to the second interior light lens 48.

The second interior light lens 48 is substantially parallel to the rear door 20. When the rear door 20 is open, the illumination from the second interior light lens 48 is directed toward the area immediately behind the truck, or if the truck's tailgate 62 is open, onto the inside surface of the tailgate 62.

As shown in FIG. 6, the interior light lenses 46,48 fit within apertures in the housing 44, and may be secured thereto by any suitable means. In the illustrated embodiment, the housing 44 defines a recessed ledge 64 around the periphery of the aperture which receives the first interior light lens 46; longitudinal slots in the ledge receive mating flanges 66 on the lens 46. For the second interior light lens 48, the housing defines recessed ledges 68 extending along the sides of the aperture, with gaps in the ledges 68, to receive mating flanges 70 on the lens 48.

For the brake light indicator lens, sets of longitudinal ribs 72 and spaced protuberances 74 hold portions of the rim of the lens 50 between them. The sets are disposed, and the surfaces of some of the ribs and protuberances are angled, so as to hold the lens 50 at a suitable angle. In this embodiment, the lens 50 is held so as to slope inwardly from its top at an angle of about 18 degrees.

To hold the reflector chassis 56, the illustrated housing 44 includes longitudinal ridges 76, and abutments, between which the longitudinal edges of the chassis 56 fit. In the illustrated embodiment, the housing 44 is made of molded plastic, and the recessed ledges 64 and 68, ribs 72, protuberances 74, ridges 76, and abutments are formed integrally therewith.

With the reflector chassis 56 positioned between the ridges 76, the interior of the housing is effectively divided into first and second compartments, a brake light chamber 60 and an interior light chamber 58, with the light bulbs 52 and 54 mounted in their respective chambers. The illustrated chassis is opaque, so that each chamber may be separately illuminated; it is also chrome-finished, so as to be reflective on both sides, to thereby enhance the illumination of the lenses.

As illustrated in FIG. 6, the chassis is shaped to define a longitudinal trough 78, which deepens into the interior light chamber 58. The trough 78 defines a flat base 80, which defines opposing longitudinal faces 82 and 84, upon which the light bulbs 52,54 are mounted. The bulbs 52 and 54 should be of a suitable power so as to meet applicable regulations and standards.

The combination light of the present invention also includes means for selectively energizing the interior light bulb and means for energizing the brake light bulb during operation of the truck brakes. The means for selectively energizing the interior light bulb may include a switch means responsive to the position of the rear door 20 of the truck cap; it may also include a manual switch means for selectively energizing and de-energizing the interior light bulb.

In the illustrated embodiment, the switch means responsive to the position of the rear door is shown in FIG. 6. It includes an automatic switch 86 having a depressible actuator 88. To support and position the switch 80, suitable support structures may be formed in the interior of the housing 44. The housing also has an aperture through which the depressible actuator 88 extends.

As shown in FIG. 5, the depressible actuator 88 extends through a bore formed in the shoulder 42 of the channel member 24. As shown in FIGS. 3–5, the shoulder 42 of the channel member 24 runs parallel to, and is spaced from a shoulder 90 on the door frame 26 of the rear wall of the cap. When the rear door 20 is closed, as shown in FIG. 3, the actuator 88 is depressed by the shoulder 90, and the switch 86 remains off, with the interior light de-energized. When the rear door is open, as shown in FIG. 4, the actuator 88 is released, and the interior light is energized.

In the illustrated embodiment, the automatic switch 86 is positioned in the brake light chamber 60, and electric leads 92 and 94 extend from the switch, through an insulating grommet 96 which insulates a bore in the reflector chassis 56. Leads 92 and 94 are connected in series with electrical leads 98 and 100 which are connected to a manual switch 102. Manual switch 102 is held by the housing 44, and extends from the interior light chamber 58, through an aperture in the housing, to the housing exterior, on the same side as the second interior light lens 48. The automatic switch 86, the manual switch 102, and the leads 92, 94, 98, and 100 are electrically connected in series with the interior light bulb 52 and the truck's electrical system. This electrical circuit arrangement allows the interior light bulb 52 to draw power from the truck's electrical system, provides for automatically energizing the interior light bulb when the door 20 is opened, and allows for a manual override of the automatic switch 86 by manual switch 102, so that the interior light may be turned on when the door 20 is closed.

The truck's electrical system is also electrically connected to a logic board 104 which is electrically connected to the brake light bulb 54. As shown in FIG. 6, the logic board 104 is mounted on the reflector chassis 56, in the brake light chamber 60. To electrically insulate the logic board from the chassis, an insulating paper is interposed between the board and chassis. The logic board 104 and electrical leads serve as the means for energizing the brake light bulb 54 from the truck's electrical system when the truck's brakes are applied. The logic board prevents the brake lights from being energized when the turn signals are operated to indicate a right or left turn. A suitable logic board is Jensen No. 3467, made by Jensen of Santa Ana, Calif.

The illustrated combination light may be easily installed on an existing truck cap. Holes are drilled into the shoulder 42 of channel member 40 to receive the actuator 88 of the automatic switch 86 and screws which secure the mounting surface 45 of the combination light to the frame 24. Electrical connections as appropriate are made to the truck's electrical system.

The foregoing description is of the preferred embodiment of the invention. It will be understood by those of ordinary skill in the art that various modifications and changes may be made without departing from the scope of the invention as defined in the claims.

I claim:

1. A combination brake light and interior light for use on a truck cap covering the load-carrying portion of a pickup truck having brakes, the truck cap having a rear door adapted to be opened and closed, the rear door including a rear window, the combination brake light and interior light comprising:
    a housing mounted to the rear door, said housing having at least first and second portions;
    a brake light lens disposed on a first portion of said housing, facing the rear window and being substantially vertically disposed when the rear door is closed;
    a brake light bulb disposed within said housing proximate to said brake light lens, such that light from said brake light bulb is transmitted through said brake light lens and the rear window;
    means for energizing said brake light bulb when the truck brakes are applied;
    a first interior light lens disposed on a second portion of said housing;
    an interior light bulb disposed within said housing proximate to said first interior light lens, such that light from said interior light bulb is transmitted through said first interior light lens; and
    means for selectively energizing said interior light bulb.

2. The combination brake light and interior light as set forth in claim 1, wherein said first interior light lens is substantially vertically disposed when the rear door is open, such that said interior light bulb when energized illuminates the load carrying portion of the pickup truck when the rear door is open.

3. The combination brake light and interior light as set forth in claim 1, wherein said housing includes a third portion, and a second interior light lens which is disposed on said third portion of said housing and is substantially vertically disposed when the rear door is closed, such that said interior light bulb when energized illuminates the load carrying portion of the pickup truck when the rear door is closed.

4. The combination brake light and interior light as set forth in claim 1, wherein said first interior light lens is obliquely disposed with respect to said brake light lens, to illuminate the load-carrying portion of the pickup truck when the rear door is open.

5. The combination brake light and interior light as set forth in claim 1, wherein said brake light lens is obliquely disposed with respect to the rear window of the truck cap.

6. The combination brake light and interior light as set forth in claim 1, wherein said means for selectively energizing the interior light bulb includes:
    switch means responsive to the position of the rear door of the truck cap such that said interior light bulb is energized when the rear door of the truck cap is open; and
    manual switch means for selectively energizing and de-energizing said interior light bulb.

7. The combination brake light and interior light as set forth in claim 1, further comprising a means disposed within said housing and dividing said housing into a brake light chamber and an interior light chamber, said means having a first face on which said interior light bulb is disposed within said interior light chamber and a second face on which said brake light bulb is disposed within said brake light chamber.

8. The combination brake light and interior light as set forth in claim 1, wherein said housing is formed by two opague members secured to each other by fastening means.

9. For use on a truck provided with brakes, electrically energized brake lights, and having a cap installed over the truck bed, the cap including a rear door hinged at the top, with a window in at least the upper portion of the door, a combination lighting assembly comprising:

a housing having substantially opaque outer walls;

a substantially opaque means for dividing said housing into at least first and second compartments, such that substantially no light is transmitted between said first compartment and said second compartment;

said housing including at least first and second light transmissive means in said outer walls, said first light transmissive means forming a portion of said first compartment, and said second light transmissive means forming a portion of said second compartment;

a means for mounting said housing within the truck cap adjacent the upper portion of the door of the cap;

a first light bulb for providing illumination in said first compartment, said first light bulb being energized with the electrically energized brake lights, light from said first light bulb passing through said first light transmissive means so as to provide a visible indication of the application of the brakes of the truck, said first light transmissive means being positioned adjacent the window of the cap, so that light from said first light bulb is visible from behind the truck through the window of the cap;

a second light bulb for providing illumination in said second compartment, light from said second light bulb passing through said second light transmissive means to provide illumination to the truck bed.

10. For use on a truck having a cap installed over the truck bed, with a rear door hinged at the top, with a window in at least the upper portion of the door, a combination lighting assembly comprising:

a substantially opaque housing;

a substantially opaque means for dividing said housing into at least first and second compartments, such that light is not transmitted between said first and second compartments;

said housing including at least first and second light transmissive means, said first light transmissive means communicating with said first compartment, and said second light transmissive means communicating with said second compartment;

a means for mounting said housing on the door of said cap;

a first light bulb mounted in said first compartment, said first light bulb being energized when the brakes are applied by the truck operator, light from said first light bulb passing through said first light transmissive means, so as to provide a visible indication of the application of the brakes of the truck, said first light transmissive means being positioned adjacent the window of the cap, so that light from said first light bulb is visible from behind the truck through the window of the topper;

a second light bulb mounted in said second compartment, light from said second light bulb passing through said second light transmissive means to provide illumination to the truck bed.

11. The combination lighting assembly as set forth in claim 10, wherein said second light transmissive means is a door is open, such that said second light bulb when energized illuminates the truck bed when the rear door is open.

12. The combination lighting assembly as set forth in claim 10, wherein said housing includes a third light transmissive means communicating with said second compartment, said third light transmissive means is substantially vertically disposed when the rear door is closed, such that said second light bulb when energized illuminates the truck bed when the rear door is closed, and the area underneath the rear door when the rear door is open.

* * * * *

UNITED STATES PATENT AND TRADEMARK OFFICE
CERTIFICATE OF CORRECTION

PATENT NO. : 4,896,136
DATED : January 23, 1990
INVENTOR(S) : Robert Hotovy

It is certified that error appears in the above-identified patent and that said Letters Patent is hereby corrected as shown below:

Column 8,
Claim 11, line 31 after "a" insert - lens which is substantially vertically disposed when the rear Signed and Sealed this First Day of June, 1993

Attest:

MICHAEL K. KIRK

*Attesting Officer*  Acting Commissioner of Patents and Trademarks